United States Patent [19]

Carli et al.

[11] Patent Number: 4,653,470
[45] Date of Patent: Mar. 31, 1987

[54] SUPPORT STRUCTURE FOR SOLAR RECEIVER PANEL TUBES

[75] Inventors: Giovanni Carli; Martin T. Keating, Jr., both of E. Hanover, N.J.

[73] Assignee: Foster Wheeler Development Corp., Livingston, N.J.

[21] Appl. No.: 811,228

[22] Filed: Dec. 20, 1985

[51] Int. Cl.⁴ .................................................. F24J 2/46
[52] U.S. Cl. .................................... 126/418; 126/448; 165/82
[58] Field of Search ............... 126/450, 451, 418, 448; 122/510, 511; 165/82, 235 A, 512

[56] References Cited

U.S. PATENT DOCUMENTS

| | | | |
|---|---|---|---|
| 1,622,303 | 3/1927 | Wyld et al. | 122/510 |
| 2,703,559 | 3/1955 | Godshalk | 122/510 |
| 4,499,894 | 2/1985 | Buckley | 126/424 |

FOREIGN PATENT DOCUMENTS 743578 12/1943 Fed. Rep. of Germany ...... 122/510

Primary Examiner—James C. Yeung
Assistant Examiner—Noah Kamen
Attorney, Agent, or Firm—Marvin A. Naigur; John E. Wilson; Martin Smolowitz

[57] ABSTRACT

A support structure for multiple adjacent parallel vertical tubes of a solar flux receiver panel, so as to provide for universal independent thermal expansion and contraction of the tubes. Each adjacent tube is attached by a lug located at an intermediate point along the tube length to a rigid horizontal steel support bar, each attachment lug being separated from the adjacent lug by a cylindrical spacer located therebetween. The support bar is attached to tie links and a truss attached to support collars located on the bar at appropriate end and central locations, the tie links and truss being pivotally attached at their other ends to a vertical support frame structure. The support structure for the vertical tubes of the solar panel provides reliable support, accommodates differences thermal expansion and contraction of the tubes, and resists transverse wind and seismic loads for the vertically-oriented solar heated panel.

12 Claims, 5 Drawing Figures

SUPPORT STRUCTURE FOR SOLAR RECEIVER PANEL TUBES

BACKGROUND OF INVENTION

This invention pertains to a support structure for multiple tubes of a solar receiver panel. It pertains particularly to a support structure for multiple parallel vertical tubes for a solar flux receiver panel, which provides freedom for thermal expansion and contraction of the tubes in the solar receiver panel assembly.

Solar receiver panels utilizing a plurality of solar heated tubes containing a circulating heat transfer fluid are generally known. Heating of such panel tubes from a cold or ambient condition to a hot operating condition by incident solar heat flux causes the panel to expand both longitudinally and transversely, so that a panel support structure must permit sufficient movement of the tubes. Also, because of differences in heat flux to the tubes and fluid flow distribution in the tubes, tube expansion occurs at varying rates and extents. Thus, a suitable tube support structure must be able to accommodate such varying amounts of tube thermal expansion and contraction for the individual tubes, and yet stably support the tubes and the solar receiver panel in an effective and reliable manner.

Several support systems for solar heated tubes have been provided in the prior art. For example, U.S. Pat. No. 3,952,725 to Edmondson discloses a solar water heater in which parallel runs of continuous tubing are supported uniformly by metal foil and thermal insulation provided on the lower or shady side of the tubes. U.S. Pat. No. 4,144,875 to Bruno et al discloses a solar collector in which parallel tubes are uniformly supported by a formed heat conductive surface. U.S. Pat. No. 4,148,296 to Parlato discloses solar heating apparatus in which adjacent tubes carrying a fluid are supported at the tube opposite ends. Also, U.S. Pat. No. 4,261,334 to Matthews discloses a solar heat collector in which serpentine-shaped coils are supported by thermal insulation. However, the prior art apparently has not provided a solar panel tube support system in which multiple parallel tubes are each attached at an intermediate location to a common support rod so as to provide for substantial thermal expansion and contraction not only for the individual tubes but also for the panel assembly. Consequently, a need has existed for such a support system for arrays of multiple solar panel tubes, and such system is advantageously provided by this invention.

SUMMARY OF INVENTION

The present invention provides a support structure for holding multiple parallel elongated tubes in a solar flux receiver panel, so as to provide for thermal expansion and contraction of the tubes. The tube support structure is advantageously utilized in a tubular solar receiver panel assembly, in which the multiple long parallel tubes are substantially vertically-oriented and sealably attached to headers located at the lower and upper ends of the multiple tubes.

In accordance with the invention, the tube support structure comprises multiple parallel tubes mounted onto a rigid support bar, the tubes being mounted by support lugs rigidly attached to the back or solar nonexposed side of each tube. The support lug rigidly attached to each tube has an elongated hole perpendicular to the axis of the tube and through which the support bar is inserted, so as to support the tubes and provide for differences in thermal expansion and contraction of the individual tubes in the panel relative to the support bar. To minimize movement of the tubes on the support bar, a cylindrical-shaped spacer which encircles the bar is inserted between the lugs of each two adjacent tubes. Also, for supporting additional tubes, for at least two locations along the support bar length, cylindrical shaped collars which encircle the bar are provided between the lugs of adjacent tubes. Each collar is rigidly attached to one end of a support link or tie rod and the support like or tie rod is pivotally attached at its other ends to a side frame support structure. Thus, the support bar and multiple parallel tubes attached thereto are supported by a pivotable tie link attached to each end of the bar, so that all expansion and contraction forces as well as wind loading forces exerted on the multiple parallel tubes are transmitted by the lugs through the support bar and the tie links to the side frame support structure. Also, to provide lateral stability and ensure controlled and predictable lateral thermal expansion of the panel, the side support links are assisted by a central triangle-shaped truss rigidly attached at its apex and to a centrally located collar on the support bar. The truss is also pivotally attached at its other end to the side support frame structure, so as to ensure lateral stability and permit the individual panel tubes to expand and contract unrestricted by the support structure.

A ceramic insulation material suitable for high temperature service is provided between the adjacent solar panel tubes and the collar/spacers, so as to protect the collar/spacers and the adjacent support bar from any incident heat solar flux that might pass between the adjacent tubes.

In the invention, the tube support structure is utilized for a tubular solar receiver panel assembly in which the multiple vertically-oriented parallel tubes are sealably attached at each end to a header, which provides for flow of a suitable heat absorbing fluid through the multiple tubes and the headers. The solar receiver panel assembly is usually supported by hanger means attached to the upper header, with the solar panel assembly being oriented substantially vertical. However the panel assembly can alternatively be supported in a substantial vertical position by suitable column support means located below the lower header.

It is an advantage of the present invention that the solar receiver panel tube support structure provides individual support for each tube and maximum freedom of expansion and contraction for the individual tubes in the panel, so that the panel is structurally stable and reliable in its operation.

BRIEF DESCRIPTION OF DRAWINGS

The present invention will be further described by reference to the following drawings, in which.

DESCRIPTION OF INVENTION

Figure 1:
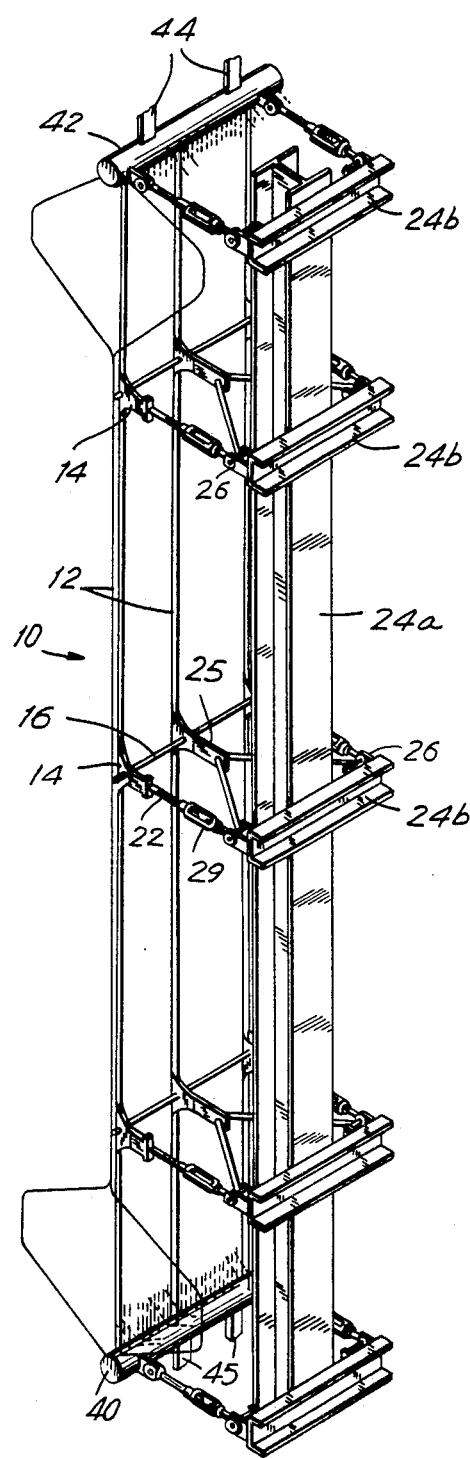
FIG. 1 shows a perspective view of a solar receiver panel having multiple parallel tubes and their support structure according to the invention, with the multiple tubes oriented in a vertical position.
Figure 2:
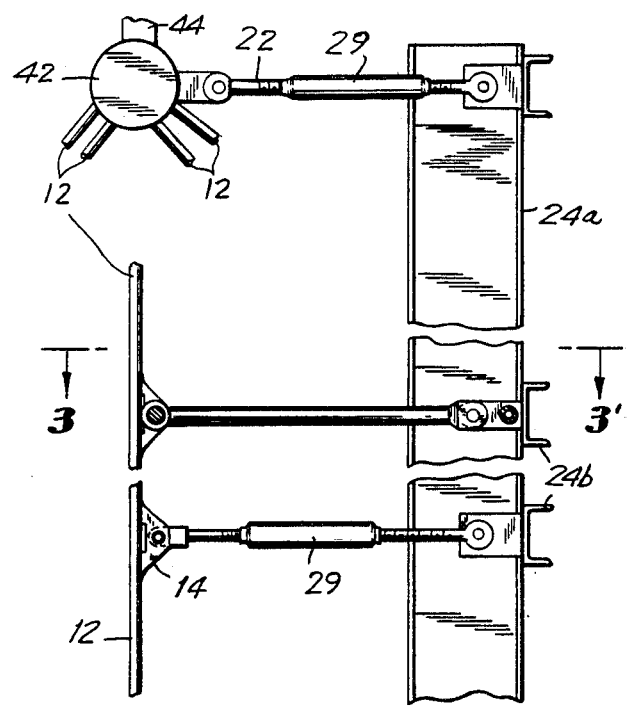
FIG. 2 shows a side elevation view of the upper portion of the panel of FIG. 1.
Figure 3:
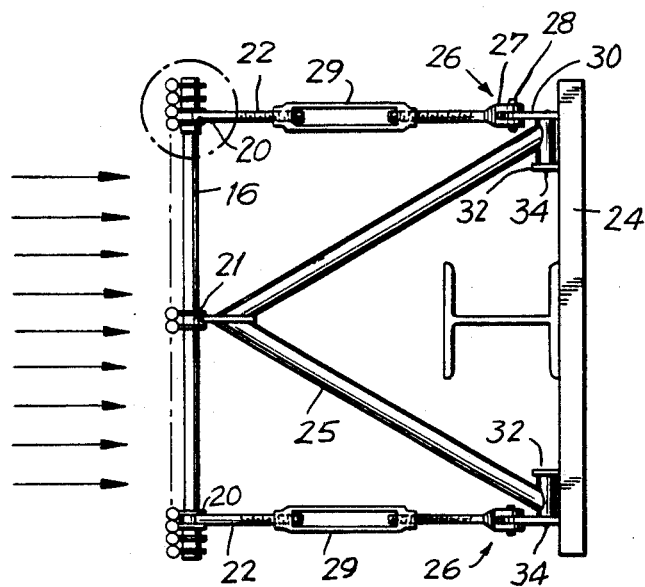
FIG. 3 shows a plan sectional view of the panel tubes and support structure taken at section 3—3' of FIG. 2.
Figure 4:
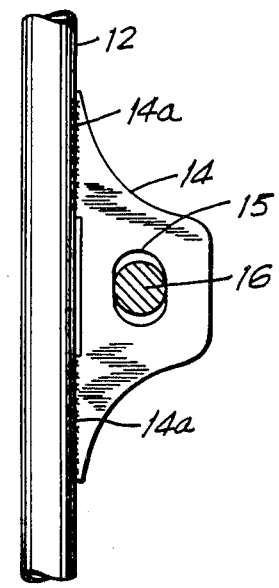
FIG. 4 shows a detail side view of a vertically oriented tube and lug rigidly attached thereto.

This invention will now be described in greater detail with reference to the drawings FIGS. 1–5. As is generally shown by FIG. 1, solar receiver panel 10 is provided consisting of a plurality of adjacent parallel tubes 12. Each tube has a lug 14 rigidly attached to its rear or nonexposed side at a location intermediate the ends of the tube, preferably by welding the lug at 14a, as is best shown by FIGS. 2 and 4. Each of the tubes 12 is supported by a rigid round bar 16, which is inserted through an elongated hole 15 in each support lug 14 rigidly attached by welded joint 14a to the nonexposed side of the tubes 12. The hole 15 in each support lug 14 is elongated in a direction parallel to the length of tube 12, and allows for differences in thermal expansion and contraction of the individual tubes 12 relative to the rigid support bar 16, as is best shown by FIG. 4.

Figure 5:
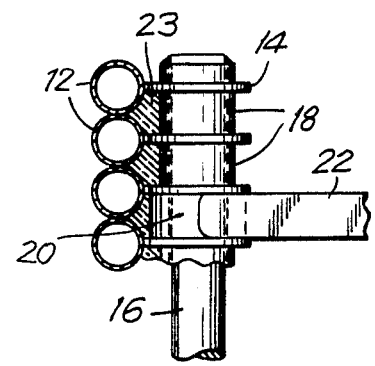
FIG. 5 is a detail plan view showing some of the multiple adjacent tubes, spacers, collar and support bar taken at one end as is shown encircled in FIG. 3.

To minimize movement of the panel tubes 12 on the support bar 16, which is preferably a rigid steel tube for weight saving compared to a solid metal bar, cylindrical-shaped spacers 18 made of short lengths of steel tubing are provided encircling the bar 16 between adjacent lugs 14. The length of each spacer 18 is related to the tube 12 diameter and the lug 14 thickness, and is selected so that the adjacent parallel tubes 12 contact each other along their length, as is best shown by FIGS. 3 and 5. Also, for at least three locations along the length of the bar 16 (depending on the width of panel 10), the spacers 18 are replaced by cylindrical-shaped support collars 20 and a centrally located support collar 21, which have a somewhat greater wall thickness and outside diameter than spacers 18 but have length equal to that of spacers 18. The collars 20 and 21 are rigidly attached to support links 22 and to the apex end of a triangular shaped support truss 25, respectively.

A ceramic insulation material 23, suitable for high temperature service is provided between the rear side of panel tubes 12 and the spacers 18 and collars 20 and 21 encircling support bar 16, as shown by FIG. 5, so as to protect the spacers and support bar from any incident solar flux that might pass between the adjacent panel tubes 12.

As shown by FIGS. 1 and 2, the multiple parallel tubes 12 are oriented substantially vertically, and the links 22 are pivotally attached to rigid side frame support structure 24. The links 22 are usually oriented substantially horizontal relative to the support frame structure 24, but are pivotally attached thereto by pivot means 26, as shown by FIGS. 1–3. Thus, any wind and seismic loads exerted on the panel tubes are transmitted from the tubes to support bar 16 and collars 20 and 21 to dual tie links 22 located at each side of the panel 10 and to centrally-located support truss 25, and then to the support frame structure 24. Thus, to ensure a controlled and predictable lateral thermal expansion of the tube panel 10, the support bar 16 is fastened to the multiple support collars 20 and to central support collar 21 which are pivotally attached to the frame structure 24 by the dual tie links 22 and the central triangular-shaped truss structure 25, which are also pivotally attached at its other to the side frame structure 24 by the pivot means 26, as shown by FIGS. 1–3. More specifically, the support collars 20 are rigidly attached to one end of dual links 22, which are pivotably attached at the link other end to frame structure 24 by pivot means 26. The support collar 21 is rigidly attached to the apex end of the triangular-shaped truss 25, which is pivotably attached at its other end to frame structure 24 by pivot means 26. Also the support structure 24 preferably includes a vertical column 24a, to which multiple vertically spaced horizontal beams 24b are rigidly attached such as by welded joints. The dual links 22 and triangular-shaped truss 25 are pivotally attached to outer ends of the horizontal beams 24b. The dual links 22 are each attached to support frame beam 24b by the dual pivot means 26, which can conveniently include a clevis 27 attached to outer post 30 by pivot pin 28. Also, the outer ends of truss structure 25 are pivotally attached to outer post 30 and inner post 32 by pin 34 at a location nearer frame 24 than the pivot pin 28.

If desired for ease of assembly and adjustment, the links 22 can each advantageously include a turnbuckle 29 threaded at each end for conveniently adjusting the length of the dual links 22 relative to the length of the central truss structure 25. Thus, the tubular panel support arrangement and structure as described allows the multiple parallel panel tubes 12 to thermally expand and contract independently of each other, thereby eliminating loads and stresses caused by differences in thermal expansion of the tubes, and also effectively transmit wind and seismic loads to the rigid support frame 24.

The support lugs 14 can be stamped or cut out of steel plate and welded at 14a to the tubes 12 at multiple spaced locations along the length of tubes 12. If desired, the support lugs, spacers, and collar arrangement can be assembled prior to welding the lugs 14 to the tubes 12, thereby saving set-up time and reducing misalignment problems occurring during fabrication of the solar receiver panel assembly.

A tubular solar receiver panel assembly is provided by the multiple parallel tubes 12 of solar panel 10 being sealably attached at their lower ends to a header 40 and sealably attached at their upper ends to a header 42. By this arrangement, a heat absorbing fluid provided to the lower header 40 can flow uniformly upwardly through the multiple parallel tubes 12 while being heated by solar radiation flux on the tubes and thence flow into the upper header 42, from which the heated fluid is passed to any desired use. The solar panel 10 is usually vertically supported by the upper header 42 being hung by hangers 44 from a suitable overhead structure (not shown), which structure is usually associated with the side frame structure 24. Alternatively, the panel 10 can be substantially vertically supported at the lower header 40 by column supports 45 from a suitable structure (not shown) located beneath the panel lower header and usually associated with side support frame 24. For a solar panel assembly supported at its upper header 42, the multiple parallel tubes 12 will expand downwardly, and the linkage bars 22 and central rod truss 25 pivot downwardly at pivot pins 28 and 34. Alternatively for a solar panel assembly supported at the lower header 42, the multiple panel tubes 12 will expand upwardly while linkage bars 22 and central rod truss 25 pivot upwardly at points 28 and 34. The vertical location of the pivot points 28 and 34 relative to bar 16 should be intermediate the extreme lowermost and uppermost positions of the bar during use of the solar receiver panel, and preferably should be at the vertical midpoint of the vertical movement of the bar 16 caused by thermal expansion of the tubes 12.

A solar receiver panel assembly will usually include at least 10 tubes, with each tube being at least 10 feet long. A solar receiver panel assembly will preferably include 12–90 tubes each 12–100 feet long. When the tubes 12 are made longer than about 10 feet, two support structure sets including two links 22 and a central truss 25 should be provided vertically separated from each other by a distance of at least about 5 feet, as shown by FIG. 1. Thus, for commercial solar receiver panels having tubes up to 100 feet long, up to 20 support link and truss sets would be needed to provide for adequate support and lateral stability of the panel 10 and multiple parallel tubes 12. A typical commercial solar receiver assembly may comprise up to 20 vertical panels units located adjacent each other, each panel having 90 tubes 100 feet long.

Because of heating the receiver panel by incident solar heat flux from a cold (ambient) temperature condition to a hot operating temperature condition, the panel tubes not only expand longitudinally in the vertical direction, but also expand horizontally across the panel width. Also, due to differences in fluid flow distribution which may occur in the tubes and in heat flux across the panel width, some panel tubes may become hotter than others and thus expand more. Thus, the tube support arrangement according to this invention for supporting multiple parallel tubes in a solar receiver panel allows the tubes to expand independently of each other and performs the essential functions of keeping the panel straight in the transverse direction while permitting independent thermal expansion both vertically and laterally in the plane of the panel, and minimizes longitudinal out-of-plane distortion (bowing) of the tube array. The tube support structure also restrains the panel tubes from moving sideways and front-to-back due to wind or seismic loads, and transmits such loads exerted on the panel tubes to the support steel frame structure.

The construction and operation of the solar panel array and support structure according to the invention will be better understood with reference to the following Example, which should not be construed as limiting the scope of the invention.

EXAMPLE

A solar receiver panel support structure was constructed in general accordance with the FIG. 1 configuration, and included 36 solar tubes. Important construction parameters for the solar panel and its support structure were as follows:
Tube length, ft: 16
Tube diameter, in.: 0.75
Support bar length, in.: 28
Support bar diameter, in.: 0.75
Tube temperature change during operation, °F: 1000
Tube length expansion, in.: 2

Tests made of the solar panel and support structure demonstrate adequate support for all loads imposed on the panel array and sufficient freedom of thermal expansion and contraction movement for all the tubes in both vertical and lateral directions.

Although this invention has been described broadly and in terms of a preferred embodiment, it is understood that modifications and variations can be made within the scope of the invention, which is defined by the following claims.

We claim:

1. A support structure for multiple parallel tubes of a solar flux receiver panel, said structure comprising:
   (a) at least two adjacent solar heated tubes, each tube having a radially oriented lug rigidly attached to an intermediate portion of the tube, said lug containing an elongated opening therein;
   (b) a rigid support bar extending transversely through the elongated opening in said lug of the adjacent tubes;
   (c) a support collar provided between the lugs of each adjacent tubes and encircling said support bar;
   (d) solid refractory insulation located between said adjacent tubes and said collar; and
   (e) a support link attached at one end to said support collar and pivotally attached at the link other end to a rigid support frame for supporting the adjacent multiple parallel solar heated tubes, whereby thermal expansion of the individual tubes is accommodated.

2. A support structure for multiple tubes according to claim 1, wherein said lug is welded to the rear unexposed side of each said tube.

3. A support structure for multiple tubes according to claim 1, wherein at least four adjacent solar heated tubes are provided, including two inner tubes and two outer tubes, said support collar being provided between the lugs for the two inner tubes, and a cylindrical spacer is provided encircling said bar and located between the lugs attached to the inner and outer tubes.

4. A support structure for multiple tubes according to claim 1, wherein said tubes are vertically oriented and said support link is pivotally attached to an adjacent vertical support frame structure.

5. A support structure for multiple tubes according to claim 3, wherein said tubes are sealably attached at each end to an upper header and a lower header adapted for providing fluid flow uniformly through the tubes.

6. A support structure for multiple tubes according to claim 5, wherein said upper header is supported by hanger means.

7. A support structure for multiple tubes according to claim 5, wherein a lower header is supported by column means.

8. A support structure according to claim 1, wherein 12–90 adjacent tubes are provided each attached to said rigid support bar, said support link is attached to a support collar at each end of said rigid bar, and a central triangular support truss is provided attached at one end to the support collar located at a central point along the length of said support bar, said triangular support truss being pivotally attached at the truss other end to said support frame.

9. A support structure according to claim 8, wherein said support links are each provided with turnbuckles threaded to each link.

10. A support structure for multiple tubes of a solar flux receiver panel, said structure comprising:
   (a) at least four adjacent solar heated tubes including two inner and two outer tubes, each tube having a radially oriented lug rigidly attached to the tube rear side at an intermediate portion of the tube, said lug containing an elongated opening therein;
   (b) a rigid round support bar extending transversely through the elongated opening in each said lug of the adjacent tubes;
   (c) a support collar encircling said support bar between the lugs of two adjacent inner tubes;
   (d) a cylindrical spacer located encircling the support bar between the lugs attached to the inner and outer tubes;

(e) solid refractory insulation material located between said adjacent elongated tubes and said collar and spacers; and (f) a support link attached at one end to said support collar and pivotally attached at the link either end to a rigid support frame for supporting the multiple adjacent solar heated tubes, whereby thermal expansion of the individual heated tubes relative to each other is accommodated.

11. A support structure for multiple tubes according to claim 10, wherein said tubes are at least 15 feet long and at least two sets of support links are provided each vertically separated by a distance at least about 5 feet.

12. A tubular solar flux receiver panel assembly, comprising:

(a) at least 12 adjacent vertically-oriented solar heated tubes including intermediate and end tubes, each tube having a radially oriented lug welded to the tube rear side at an intermediate portion of the tube, said lug containing an elongated opening therein;

(b) a rigid round support bar extending transversely through the elongated opening in said lugs of the adjacent tubes;

(c) a cylindrical support collar encircling said support bar between two adjacent intermediate lugs;

(d) at least one spacer located between the lugs for the intermediate and end tubes;

(e) a header sealably attached to upper and lower ends of said tubes, said upper header being supported by hanger means;

(f) solid refractory insulation material located between said adjacent solar tubes and said collar and spacers;

(g) dual support links attached at one end to said support collars for supporting the multiple solar heated tubes, each said support link being pivotably attached at its other end to a rigid vertical support frame by pivot means; and (h) a central triangular-shaped support truss attached at its apex to the support collar located at a central point along the length of said support bar, and attached at its other end to said pivot means, whereby thermal expansion of the vertically-oriented solar heated tubes relative to each other is accommodated.

* * * * *